UNITED STATES PATENT OFFICE.

CARL HOFFMANN, OF HÖCHST-ON-THE-MAIN, GERMANY, ASSIGNOR TO FARBWERKE, VORM. MEISTER, LUCIUS & BRÜNING, OF HÖCHST-ON-THE-MAIN, GERMANY, A CORPORATION OF GERMANY.

ALKYLATED AURAMINS AND PROCESS OF MAKING SAME.

SPECIFICATION forming part of Letters Patent No. 720,920, dated February 17, 1903.

Application filed May 29, 1902. Serial No. 109,565. (Specimens.)

*To all whom it may concern:*

Be it known that I, CARL HOFFMANN, Ph.D., a citizen of the Empire of Austria-Hungary, residing at Höchst-on-the-Main, Germany, have invented certain new and useful Improvements in the Manufacture of Alkylated Auramins, of which the following is a specification.

I have found that auramin may be substituted by an alkyl in the keton-imid group by heating the auramin base with an alkylhalide while adding an agent capable of combining acids. Thus a series of new auramins is obtained, which form yellow-tinted salts and dye cotton yellow shades. The new auramins are insoluble in water, soluble with some difficulty in ether, and readily soluble in chloroform or hot alcohol. On treating these alkylauramins with dilute mineral acids and reducing agents they have the same behavior as auramins. They are decomposed into alkylamin and tetraälkyldiamido-benzophenon or transformed into colorless compounds, respectively.

The general method for obtaining the new alkyl derivatives of auramin consists in treating the auramin base (tetraälkyl-para-diamido-benzophenon-imid) in the presence of an agent capable of combining with acids with the corresponding quantity of an alkylhalide. It is best to use as additions lime, magnesia, zinc, or mercuric oxid. It is preferable to operate in the presence of an indifferent solvent, such as benzene, toluene, or xylene.

Example: Ten parts, by weight, of the auramin base are dissolved in thirty parts of hot xylene. To this solution are added five parts of calcined magnesia, and then, while continuously stirring, 4.8 parts of benzyl chlorid. After some time the temperature is raised to 130° centigrade, stirring being continued for another half-hour. When cold, the xylene solution is filtered and on evaporation the benzylauramin crystallizes. Recrystallized from alcohol it forms colorless prisms having the melting-point 116° centigrade. It is pretty easily soluble in chloroform and hot alcohol, insoluble in water, and soluble with difficulty in ether. It forms with mineral acids yellow crystallizing salts and, like auramin, dyes mordanted cotton yellow. The dyeings are faster to soap and soda than those obtained with auramin.

If in the above example for benzyl chlorid other alkylhalides are used—such as ethyliodid, mono-chloroacetic acid ethyl ester—then alkylauramin analogous to benzylauramin are obtained having the properties already mentioned.

Having now described my invention, what I claim is—

1. The herein-described process for the manufacture of alkylated auramins which consists in heating the auramin base (tetraalkyl-para-diamido-benzophenon-imid) with one equivalent of an alkylhalide while adding an agent capable of combining with acids, substantially as set forth.

2. As new products the alkylated auramins, being crystalline compounds insoluble in water, soluble with some difficulty in ether, readily soluble in chloroform or hot alcohol; the salts of the new auramins are yellow; on treatment with dilute mineral acids or reducing agents they have the same behavior as auramin; they dye mordanted cotton pure yellow to greenish-yellow shades.

3. The herein-described process for the manufacture of benzylauramin which consists in heating an auramin base (tetraälkyl-para-diamido-benzophenon-imid) in the presence of an agent capable of combining acids with an equivalent quantity of benzyl chlorid, substantially as set forth.

4. As a new product, benzylauramin, a compound having the melting-point 116° centigrade, easily soluble in chloroform and hot alcohol, insoluble in water and soluble with difficulty in ether, forming with mineral acids yellow crystalline salts and dyeing mordanted cotton yellow like auramin.

In testimony that I claim the foregoing as my invention I have signed my name in presence of two subscribing witnesses.

CARL HOFFMANN.

Witnesses:
  ALFRED BRISBOIS,
  HEINRICH HAHN.